United States Patent
Ueshima

(10) Patent No.: US 6,731,731 B1
(45) Date of Patent: May 4, 2004

(54) AUTHENTICATION METHOD, AUTHENTICATION SYSTEM AND RECORDING MEDIUM

(75) Inventor: Yasushi Ueshima, Tokyo (JP)

(73) Assignee: Comsquare Co., Ltd., Tokyo (JP)

( * ) Notice: Subject to any disclaimer, the term of this patent is extended or adjusted under 35 U.S.C. 154(b) by 567 days.

(21) Appl. No.: 09/806,350

(22) PCT Filed: Jul. 3, 2000

(86) PCT No.: PCT/JP00/04399

§ 371 (c)(1),
(2), (4) Date: Mar. 29, 2001

(87) PCT Pub. No.: WO01/09735

PCT Pub. Date: Feb. 8, 2001

(30) Foreign Application Priority Data

Jul. 30, 1999 (JP) .......................... 11-216948

(51) Int. Cl.[7] .......................... H04M 3/00; G06F 12/14
(52) U.S. Cl. ........................ 379/196; 713/201
(58) Field of Search ................. 379/189, 191, 379/196, 197, 198, 114.02; 713/200, 201, 202

(56) References Cited

U.S. PATENT DOCUMENTS

2001/0000358 A1 * 4/2001 Isomichi et al. ............ 713/201
2002/0106065 A1 * 8/2002 Joyce et al. ............ 379/114.02

FOREIGN PATENT DOCUMENTS

| EP | 686905 | 12/1995 |
|---|---|---|
| JP | 08-227397 | 9/1996 |
| JP | 10-229459 | 8/1998 |
| JP | 10-336345 | 12/1998 |
| JP | 10-341224 | 12/1998 |
| JP | 11-120397 | 4/1999 |
| JP | 11-161618 | 6/1999 |
| JP | 11-178022 | 7/1999 |
| JP | 2000-10927 | 1/2000 |

* cited by examiner

Primary Examiner—Benny Tieu
(74) Attorney, Agent, or Firm—Collard & Roe, P.C.

(57) ABSTRACT

When a service provider authenticates a preliminarily registered user, a telephone number of a telephone of the user is registered prior to the authentication and the user calls a CTI (computer telephony integration) server by the use of the telephone. The CTI server authenticates the user with reference to the telephone number of the call received. A password is generated by an information processing device such as the CTI server and is transmitted to both the user and the service provider. The service provider compares the received password and a password inputted by the user and provides the user with service upon coincidence between both passwords.

30 Claims, 6 Drawing Sheets

AUTHENTICATION METHOD, AUTHENTICATION SYSTEM AND RECORDING MEDIUM

CROSS REFERENCE TO RELATED APPLICATIONS

Applicant claims priority under 35 USC 119 of Japanese application No. 216948/1999 filed Jul. 30, 1999. Applicant also claims priority under 35 USC 120 of PCT/JP00/04399 filed Jul. 3, 2000. The international application under PCT article 21(2) was not published in English.

TECHNICAL FIELD

This invention relates to CTI (computer telephony integration) and, particularly, to user authentication utilizing a CTI technique.

BACKGROUND TECHNIQUE

In the modern society, a technique for authenticating a person who has preliminarily been registered as a regular user (hereinafter called as a registered user) is used in various situations in the society. For example, such an authentication technique is utilized in the situations where a user makes access to information providing service on a communications network system or where an electronic lock set at an entrance of an office building is unlocked.

As the above-mentioned authentication technique, use has traditionally been made of a system in which each registered user is assigned with a fixed password. Upon authentication, a user of the system is required to input a password, which is then compared with the password which has already been registered. Only when the coincidence is detected between them, the user is allowed to use the system. Hereinafter, such a technique that the authentication is carried out by the use of the fixed password as a general rule will hereinafter be called a fixed password system. In the fixed password system, the registered user can easily be authenticated. However, it is difficult to create, as a password, a character string which can easily be memorized only by the registered user and which can not be guessed by a third person other than the registered person. It is also difficult to make all the registered users conduct perfect management of the password. Under the circumstances, it is highly probable that the fixed password system is invaded if repeatedly attacked as a target of a hacker.

In order to overcome the above-mentioned disadvantages of the fixed password system, a variety of techniques have been proposed.

For example, Japanese Unexamined Patent Publication (JP-A) H10-336345 discloses an authentication system which is used when a user's information terminal is connected to an information provider on the communications network system. In this authentication system, the registered user is authenticated by the use of a caller's telephone number peculiar to the user's information terminal instead of the fixed password system. Therefore, it is possible to prevent the third person from making access to the information provider by using any device other than the information terminal which is registered.

However, restrictions have been imposed on the above-mentioned technique such that a terminal for use in authentication of the registered user should be the same as a terminal for use in receiving the service from the information provider. In other words, because the telephone number used by the information terminal of the registered user is registered, even the registered user can not be authenticated if he/she uses another information terminal connected with an unregistered telephone number.

The above-mentioned authentication system can be used in authentication of making access to the information provider on the communications network system. However, the system is not available to authentication of using an information processing device which can not be accessed from the user's terminal. Specifically, no authentication can be executed by the above-mentioned system in case where the electronic lock of the building is unlocked or in case where a customer is authenticated at a cash dispenser in a bank.

Moreover, since the telephone number used by the information terminal is authenticated, it is not possible to separately authenticate individual users in case where a single information terminal is used by a plurality of users.

Beside the above-mentioned technique disclosed in JP-A H10-336345, a so-called one-time password system is known as a technique to solve the problem in the fixed password technique. In the fixed password system, the password is kept unchanged unless it is renewed by a system side or the registered user. On the other hand, in the one-time password system, a new password is used every time when the authentication is performed. Therefore, even if the password is leaked to the third person, it is possible to minimize a damage. As a conventional technique utilizing the one-time password system, the following techniques are known.

In the technique disclosed in JP-A H11-178022, use is made of a password generator which changes a generated password upon every authentication in synchronism with an authentication server. Upon requesting the authentication to the authentication server, the registered user transmits to the authentication server the password generated by the password generator together with an ID of the registered user himself/herself. As the authentication server is synchronized with the password generator, it is possible to generate a password corresponding to the ID at the time instant when the authentication is requested. Thus, the authentication server can authenticate the user by comparing the password received from the user and the password generated by the authentication server itself.

In the technique disclosed in JP-A H8-227397 or JP-A H11-161618, each individual registered user is assigned with a different coding rule. Each registered user is given a decoder which is operable in accordance with the coding rule assigned to him/her. When the ID is transmitted from the user, the authentication server randomly generates a password, encodes the password in accordance with the coding rule assigned to the user of the ID, and thereafter sends the encoded result to the user. Upon reception of the encoded result, the user decodes the password by the use of his/her decoder and sends the decoded result back to the authentication server. The authentication server authenticates the user by comparing the password generated by itself and the data sent back from the user.

In the above-mentioned conventional techniques utilizing the one-time password system, it is necessary to prepare for every registered user private hardware or a set of private software and hardware which can execute the software. The private hardware or the private software is often expensive. As the hardware necessary to execute the private software, a mobile information apparatus or a notebook type personal computer can be used. However, these apparatuses are not low in price and not available to everybody, although they are increasingly and widely spread. Therefore, the cost problem arises also in this case. Moreover, the use of the private hardware urges the user to carry the apparatus which is required only for the authentication. This will spoil the convenience.

The object of the present invention is to provide an authentication technique using a new one-time password system which solves the problems in the fixed password system and the technique disclosed in JP-A H11-336345 as well as the problems in the conventional one-time password system disclosed in JP-A H11-178022, JP-A H8-227397, and H11-161618. More particularly, the present invention has the following objects to be solved:

Private hardware or software exclusively for authentication and liable to be expensive is not necessary.

A terminal for authentication and a terminal used for reception of service need not be the same.

Use is also possible in authentication at an information processing device, such as an electronic lock for locking a building and an automatic cash dispenser, which can not be accessed from a user's terminal.

Individual users can be separately authenticated even if the same terminal is used by a plurality of users.

DISCLOSURE OF THE INVENTION

In order to solve the above-mentioned problems, the present invention provides a user authentication method, a user authentication system, and a recording medium with a user authentication program recorded therein.

(1) User Authentication Method

A user authentication method provided by the present invention is a method of authenticating a preliminarily registered user by a device for providing service (hereinafter referred to as a service provider) and is characterized by the steps: (1) a telephone number of a telephone of the user is registered prior to the authentication, (2) the user calls a CTI (computer telephony integration) server by using the telephone thus registered, (3) the CTI server authenticates the user with reference to the telephone number received, (4) the CTI server or another information processing device operable in cooperation with the CTI server generates a password, (5) the password thus generated is transmitted to both the user and the service provider, (6) the user inputs the password which he/she has received by a device (hereinafter referred to as a service access authentication device) for authenticating the access to the service provider, (7) the service access authentication device compares the password received in the step (5) and the password inputted in the step (6) and, upon coincidence between both passwords, allows the user to access to the service provider, and (8) the password which has been used for the authentication is invalidated. It is noted that the service provider mentioned herein is a device for directly providing service to the user, for example, a WEB server, an electronic lock, an automatic financing device such as an automatic cash dispenser, and the like. The service access authentication device is a device for authenticating the user who desires to be given the service, for example, an authentication server and the like.

In the above-mentioned user authentication method, the password may be invalidated, even if the user has not yet been authenticated by the use of the password, in case where a predetermined time period has lapsed after the password is generated. In this manner, the safety of the authentication can be guaranteed even in case where the user for some reasons has lost or forgotten the password and left the password untouched without being authenticated.

It is especially preferable that the telephone whose telephone number is registered in the step (1) is a portable mobile communication terminal. Herein, the portable mobile communication terminal means a portable telephone such as a so-called cellular phone or a PHS (personal handy phone system) terminal. In the present invention, the portable mobile communication terminal is used as a device which is analogous to the conventional password generator. Since the portable mobile communication terminal has already been wide spread, this invention is not only advantageous in view of the cost but also has a merit that the user need not carry a password generator exclusively for the purpose of the authentication, as compared with the case where such special password generator is used.

The destination of the password to be transmitted to the user in the step (5) and a data format thereof may be determined by the user. In the present invention, a method of notifying the password to the user can be selected from a plurality of methods and such method may be determined depending on the type of notifying means supported by the system or the convenience of the user. For example, the password may be transmitted by the following methods.

The password is transmitted and informed as character data to a pager having a preliminarily registered telephone number.

The password is transmitted as image data to a facsimile apparatus having a preliminarily registered telephone number.

The password is transmitted as a speech produced by a speech synthesizer to the telephone which is registered in the step (1). In this case, after the authentication is carried out with reference to the caller's phone number in the step (3), the line between the telephone and the CTI server is maintained to transmit the speech to the telephone.

The telephone which is registered in the step (1) comprises image display means. The password transmitted to the user in the step (5) is transmitted as character data to the telephone which is registered in the step (1). Because most of the recent telephones and the portable mobile communication terminals are provided with the image display means, the password can be visually and easily be confirmed.

The password is transmitted as an electronic mail to a mail address specified by the user. This is proposed taking into consideration the spread of the portable information terminals and notebook type personal computers. In the electronic mail through the Internet, it is difficult to keep complete secrecy of its content. In the present invention, however, the validity term of the password can be set as short as possible so that no substantial problem arises even if the password is leaked. Thus, no substantial influence is given to the security of the system.

The password is transmitted as binary data. In this case, the user is required to have a program corresponding to the binary data. However, any person who has obtained the binary data by some method can not directly see the content of the data. Therefore, the security of the system can further be improved.

The telephone registered in the step (1) comprises radio communication means and the input of the password to the service access authentication system in the step (6) is carried out via the radio communication means. In this case, the user need not manually input the password and therefore the operation by the user will be more facilitated. Moreover, since no manual input is carried out, the probability of occurrence of input errors is decreased.

(2) User Authentication System

According to the present invention, there is provided a user authentication system which comprises one or a plurality of information processing devices operable in cooperation through mutual data communication and a telephone assigned to each user, and which is wherein any one of the information processing devices includes line connection means to be connected to a telephone through a telephone line, caller's number identifying means for identifying a caller's telephone number of a call received at the line connection means, a first recording medium for storing, as user information associated with each user, information relating to each user and including a telephone number of the telephone assigned to the user, telephone number searching means for searching, by referring to the first recording medium, the telephone numbers given to the telephones assigned to the respective users and contained in the user information to find whether or not the telephone number identified by the caller's number identifying means is present, password generating means for generating a password, a second recording medium for storing the password generated by the password generating means in association with the user information stored in the first recording medium, password notifying means for notifying the password to an appropriate destination by referring to, as a destination, the telephone number searched by the telephone number searching means or the user information associated with the telephone number, password input means for receiving an input password inputted by the user, authentication means for comparing the password stored in the second recording medium and the input password supplied through the password input means and authenticating the user upon coincidence between both passwords, and means for deleting from the second recording medium or invalidating a particular password which satisfies a predetermined condition.

In the above-mentioned user authentication system, it is especially preferable that the telephone assigned to each user is a portable mobile communication terminal.

For example, following means may be used as the password notifying means. A plurality of kinds of the following notifying means may be included.

Any one of the information processing devices further comprises speech synthesizing means for synthesizing a speech corresponding to the password generated by the password generating means. The password notifying means transmits the speech synthesized by the speech synthesizing means through the telephone line.

Any one of the information processing devices further comprises facsimile image data generating means for generating facsimile image data corresponding to the password generated by the password generating means. The password notifying means transmits the facsimile image data generated by the facsimile image data generating means through the telephone line.

Any one of the information processing devices further comprises pager data generating means for generating data for a pager to display the password generated by the password generating means. The password notifying means transmits the data generated by the pager data generating means through the telephone line.

Any one of the information processing devices further comprises electronic mail generating means for generating an electronic mail indicating the password generated by the password generating means and means for establishing connection to the Internet. The password notifying means transmits the electronic mail generated by the electronic mail generating means through the Internet.

The condition for deleting or invalidating the password is, for example, the case where a predetermined time period has lapsed after the password is generated by the password generating means, the case where a preselected time period has lapsed after the latest authentication was carried out by the use of the password, or the case where the password has been used for authentication a predetermined number of times. As a general rule, the password can not be used again if it is used once for authentication after generation. In addition, the password may be deleted or invalidated under the conditions mentioned above by considering and comparing the convenience of the user and the security of the system.

The above-mentioned user authentication system is applicable to all systems for authenticating a person and, for example, is usable for authentication in the following cases.

The authentication means authenticates the access to contents on the network.

The authentication means is connected to a device for controlling an electronic lock and allows the electronic lock to be unlocked.

The authentication means authenticates the user of an automatic financing device.

(3) Recording Medium with a User Authentication Program Recorded Therein

According to the present invention, there is provided a recording medium with a user authentication program recorded therein, the recording medium being a machine-readable recording medium storing the program to be executed by one or a plurality of information processing devices and operable in cooperation through mutual data communication, wherein the recording medium stores the user authentication program for making the information processing device execute an operation of generating a first table storing, as user information associated with each user, information relating to each user and including a telephone number of a telephone assigned to the user, a caller's number identifying operation of identifying a caller's telephone number of a call received through a telephone line, a telephone number searching operation of searching, by referring to the first table, the telephone numbers given to the telephones assigned to the respective users and contained in the user information to find the telephone number identified by the caller's number identifying operation, a password generating operation of generating a password, an operation of generating a second table storing the password generated by the password generating operation in association with the user information stored in the first table, a password notifying operation of notifying the password to an appropriate destination by referring to, as a destination, the telephone number found by the telephone number searching operation or the user information associated with the telephone number, a password input operation of receiving an input password inputted by the user, an authenticating operation of comparing the password stored in the second table and the input password supplied by the password input operation and authenticating the user upon coincidence between both passwords, and an operation of deleting from the second table or invalidating a particular password which satisfies a predetermined condition.

For example, following operations may be used as the password notifying operation:

The user authentication program further includes a speech synthesizing operation of synthesizing a speech corresponding to the password generated by the password generating operation. The password notifying operation makes the information processing device execute an operation of transmitting the speech synthesized by the speech synthesizing operation through the telephone line.

The user authentication program further includes a facsimile image data generating operation of generating facsimile image data corresponding to the password generated by the password generating operation. The password notifying operation makes the information processing device execute an operation of transmitting the facsimile image data generated by the facsimile image data generating operation through the telephone line.

The user authentication program further includes a pager data generating operation of generating data for a pager to display the password generated by the password generating operation. The password notifying operation makes the information processing device execute an operation of transmitting the data generated by the pager data generating operation through the telephone line.

The user authentication program further includes an electronic mail generating operation of generating an electronic mail indicating the password generated by the password generating operation and an operation of establishing connection to the Internet. The password notifying operation makes the information processing device execute an operation of transmitting the electronic mail generated by the electronic mail generating operation through the Internet.

The condition for deleting or invalidating the password is, for example, the case where a predetermined time period has lapsed after the password is generated by the password generating means, the case where a preselected time period has lapsed after the latest authentication was carried out by the use of the password, or the case where the password has been used for authentication a predetermined number of times. As a general rule, the password can not be used again if it is used once for authentication after generation. In addition, the password may be deleted or invalidated under the conditions mentioned above by considering and comparing the convenience of the user and the security of the system.

The program recorded in the above-mentioned recording medium is applicable to all systems for authenticating a person and, for example, is usable for authentication in the following cases.

To make the information processing device execute an operation of authenticating the access to contents on the network.

To make the information processing device execute an operation of allowing an electronic lock to be unlocked.

To make the information processing device execute an operation of authenticating the user of an automatic financing device.

BEST MODE FOR EMBODYING THE INVENTION

1. Outline

Figure 1:
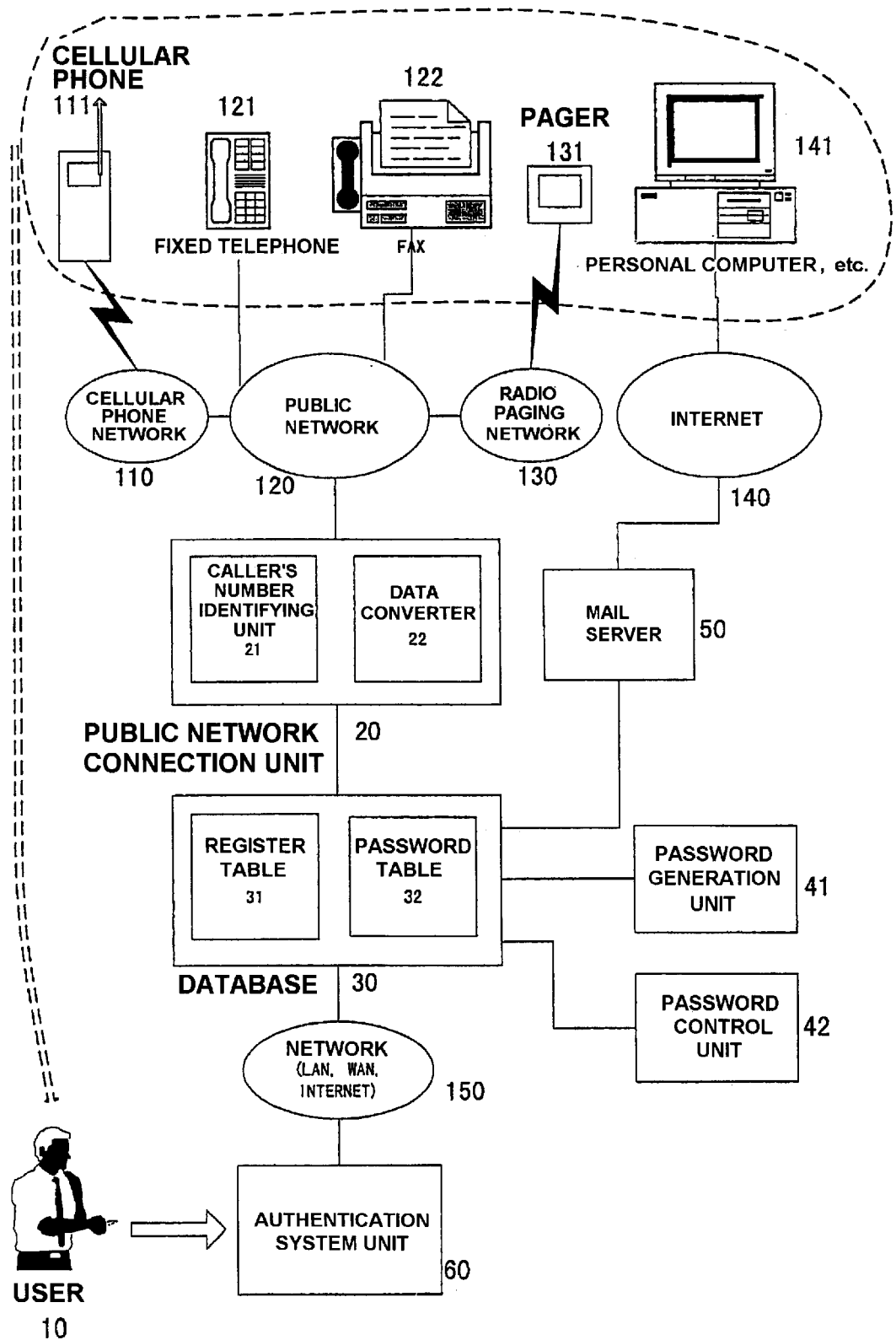
FIG. 1 is a view for describing a system structure of a user authentication system 1 according to a first embodiment of the present invention.

First of all, description will be made about an outline of the present invention. According to the present invention, a password is generated after a user is authenticated by a combination of a caller's ID service (caller's telephone number notifying service) provided by a communication carrier and a CTI system. The generated password is transmitted to both a user's terminal apparatus and an information processing apparatus or the like which directly controls an apparatus for providing service desired by the user. As a general rule, a single password can be used for authentication only once or a predetermined number of times. A password which is kept for a predetermined time period after it is produced may be invalidated even if it is not yet used.

As a terminal apparatus for use in authenticating the user, a portable mobile communication terminal apparatus such as a cellular phone or a PHS (personal handy phone system) terminal wide spread is especially preferable. The user who has been authenticated receives a one-time password by his/her own terminal apparatus.

The user may receive a password as a speech produced by a speech synthesizer. In this case, the user's terminal apparatus requires only a basic function as a telephone. On condition that the user's terminal apparatus includes a display unit, the password may be text data. If the user is allowed to specify the destination of the one-time password at the time of the authentication by a caller's ID, it is also possible to receive the one-time password by a FAX or a pager. Moreover, it is possible to receive the password by various kinds of information apparatuses if it is received as an electronic mail to a specified mail address.

Since an apparatus actually used by the user is not necessarily be same as an authenticating apparatus for performing the authentication with reference to the caller's ID, the load can be distributed. The user's terminal apparatus and the authenticating apparatus are connected by a telephone line. On the other hand, the authenticating apparatus and the desired apparatus to be used by the user should be connected by any line. However, between the user's terminal and the desired apparatus, connection is not essential and even no connection may be established.

In case where the password is transmitted to a terminal having infrared communication means and such data are transmitted by the use of the infrared communication means to the desired apparatus for authentication, the user need not manually input the password so that input errors of the password can be prevented and the convenience to the user is obtained. In this event, the password need not directly be read by the user and therefore binary data may be used therefor. In this case, the infrared communication should be carried out by the use of a program corresponding to a data format of the binary data. Therefore, even when the password is received, false authentication can not be performed without the corresponding program. Thus, the safety is further improved.

2. Structure of User Authentication System 1

Next, description will be made about a user authentication system 1 according to a first embodiment of the present invention with reference to FIG. 1.

In the user authentication system 1, a user 10 uses a cellular phone 111 and requests a password generation unit 41 to generate and transmit a password. It is assumed here that, as a general rule, the cellular phone 111 is used only by the user 10. If this condition is satisfied, a fixed telephone 121 may be used as a telephone for use in requesting the generation of the password. Hereinbelow, the telephone used by the user for requesting the system to generate the password will be called a password generation requesting terminal. A terminal which can be used as the password generation requesting terminal is any terminal having its own telephone number. Such terminal may be, besides the cellular phone 111 and the fixed telephone 121, a PHS (personal handy phone system) terminal, a telephone attached to a facsimile machine, a portable information terminal (PDA) with a telephone function, a personal computer connected with a modem or a terminal adaptor, or the like.

On the other hand, the user 10 may receive the password as a speech by the cellular phone 111 or the fixed telephone 121. In case where the cellular phone 111 or the fixed telephone 121 has image display means, the password may be displayed as characters. Likewise, the password may also be received by a facsimile machine 122, a pager 131, or a personal computer 141. Hereinafter, the apparatus, such as the above-mentioned communication terminals, used by the user to receive the password from the system will be called a password receiving terminal. The user inputs the password received by the password receiving terminal to an authentication system unit 60 and will finally be authenticated by the authentication system unit 60.

As described above, according to the present invention, the password generation requesting terminal and the password receiving terminal are used when the user is authenticated. This is because, in the present invention, authentication is performed by two steps, i.e., a step in which the authentication is performed by the use of a caller's telephone number and another step in which the authentication is performed by comparing a password received by the user 10 from the password generation unit 41 with another password received by the authentication system unit 60 from the password generation unit 41. As will be described later, a single terminal may be used in common as the above-mentioned two kinds of terminals. In this case, however, it is inevitable to use the telephone to meet functional requirements of the password generation requesting terminal.

Next, description will be made about characteristic elements of the user authentication system 1. A public network connection unit 20 serves as an interface connecting a public network 120 and a database 30 and has a function of obtaining information necessary for user authentication (more precisely, authentication of the telephone number of the password generation requesting terminal, such as the cellular phone 111 or the fixed telephone 121, to be used by the user upon authentication). Specifically, the public network connection unit 20 comprises a caller's number identifying unit 21 for identifying a caller's telephone number of a received call and a data converter 22 for converting the password generated by the password generation unit 41 into a data format receivable by the password receiving terminal such as a telephone, a facsimile machine, a pager, or an electronic mail terminal. For example, if the password receiving terminal is a telephone, the data converter 22 includes a speech synthesizer. If it is the facsimile machine, means for converting a character string of the password into an image is included. Thus, the structure of the data converter 22 differs depending on the type of the terminal supported as the password receiving terminal by the user authentication system 1.

The caller's telephone number identified by the caller's number identifying unit 21 is transmitted to the database 30. The database 30 stores a register table 31 storing information relating to each proper user (user information) and a password table 32 storing each password generated by the password generation unit 41. The register table 31 includes the telephone number of the password generation requesting terminal which is used by the user upon requesting authentication, and comprises the user information stored in association with the telephone number. Herein, the description is made about the two tables merely for convenience. However, a single table may be used instead. In case where the two tables related to each other are used, the register table 31 and the password table 32 may be controlled by different databases. Upon reception of the telephone number from the caller's number identifying unit 21, the database 30 refers to the register table 31 to search whether not the telephone number is registered as a telephone number of any proper user. If the telephone number is not registered in the register table 31, the database 30 requests the public network connection unit 20 to interrupt the line. If the received telephone number belongs to any proper user, the database 30 requests the password generating unit 41 to generate the password.

The password generating unit 41 generates the password in accordance with a predetermined logic. Generally, the password to be generated is a combination of numerals, alphabets, symbols, katakana, and other characters. Alternatively, other character species may be used. The number of digits of the character string as the password to be generated may be fixed or variable.

A password control unit 42 monitors each password stored in the password table 32 and carries out an operation of invalidating the password under a predetermined condition (password invalidating condition). As the password invalidating condition, the following conditions can be proposed.

(Condition 1) In case where the authentication system unit 60 performs authentication N times by using the password in consideration.

Herein, N is a natural number. The condition can be set, for example, by adding to the password table 32 an item representative of the number of times of authentication. The safety is higher when the number N is smaller. The safest is a condition where N=1, i.e., where the same password is used for authentication only once. In case where the above-mentioned condition is set, the password having been used for authentication may be deleted from the password table 32 instead of recording the number of times of authentication.

(Condition 2) When a predetermined time period has lapsed after the password is generated, the password is invalidated regardless of the number of times of use of the password for authentication. This condition can be implemented, for example, by providing the password table 32 with an item to record a time instant of generation of the password in consideration. The password control unit 42 checks the item at every preselected time interval and deletes the password after lapse of the predetermined time period.

(Condition 3) In case where N is equal to or greater than 2 in the condition 1, the password is invalidated when a predetermined time period has lapsed after the latest authentication was performed. This condition can be implemented, for example, by providing the password table 32 with an item to record a time instant at which the password in consideration is last used for authentication. The password control unit 42 checks the item at every preselected time interval and deletes the password after lapse of the predetermined time period.

(Condition 4) When the user has a generated password which is still effective and he requests the generation of another password, the password is renewed regardless of the status of use of the existing password.

The above-mentioned conditions can be used alone but are more effectively used in combination. For example, the condition 1 is adopted so that authentication by the same password is limited to only once and, simultaneously, the condition 2 is adopted so that the password is invalidated when 3 minutes has lapsed after it is generated, even if authentication has not yet been performed. Thus, false authentication is extremely difficult.

A mail server 50 receives from the database 30 the password and a mail address, prepares an electronic mail including the received mail address as its destination and the password as its content, and transmits the electronic mail through the Internet 140 to a mail terminal 141. The mail server 50 converts the password into the data format receivable by the mail terminal 141 as the password receiving terminal and transmits the password. In this respect, the mail server has the function corresponding to the public network connection unit 20 and the data converter 22.

The authentication system unit 60 is connected through a network 150 to the database 30, authenticates the user 10 by the use of the password in the password table 32 and the password inputted by the user 10, and provides various kinds of service to the registered user. The network 150 is, for example, a LAN (local area network), a WAN (wide area network), or the Internet. In FIG. 1, only one authentication system unit 60 is illustrated for convenience of description. Alternatively, a plurality of authentication system units 60 may be present on the network 150 and the authentication system units 60 may provide different kinds of service, respectively. The followings are specific examples of the service.

EXAMPLE 1

The user of an WEB page on the network is authenticated. In this case, the user accesses the WEB page from a terminal which is connected to the authentication system unit 60 through the network and which can display the WEB page. The input of the password on the side of the user is carried out by the use of such WEB terminal.

EXAMPLE 2

The user who unlocks an electronic lock at the entrance of a building is authenticated. In this case, the electronic lock is required to have an input device for receiving the input of the password. In the example 2, there is an embodiment in which the user 10 uses the cellular phone provided with radio communication means such as an infrared communication device as a terminal serving as both the password generation requesting terminal and the password receiving terminal. In other words, a single cellular phone is used to request the generation of the password and to receive the generated password. The generated password is transmitted by the radio communication means. Correspondingly, the electronic lock is provided with the radio communication means and receives the password from the cellular phone through radio communication. In this embodiment, it is possible to offer user's convenience such as saving of time required for the inputting operation and a reduced possibility of input errors as compared with the case where the user himself inputs the password.

EXAMPLE 3

An individual is authenticated at an ATM (automated teller machine), for example, in a bank. In the ATM wide spread at present, the individual is authenticated by a combination of a magnetic card and a fixed identification number. Instead, the individual is authenticated by a combination of the magnetic card and the password received by the user according to the present invention. In this event, it is very difficult for the third person to guess the password. Therefore, the magnetic card will not hardly be misused even when it is lost or stolen. It is preferable to provide a mechanism for authenticating, at the password generation requesting terminal, the user of the password generation requesting terminal. Such password generation request terminal may be, for example, a cellular phone which can not be operated unless the password is preliminarily inputted.

3. Operation of User Authentication System 1

Next, description will be made about a process carried out in the user authentication system 1 after the user 10 requests the generation of the password and until the user receives the service at the authentication system unit 60.

(1) From the request for generating the password to the generation of the password.

An outline of a process after the user requests the generation of the password and until the password is generated is as follows.

$\hat{1}$ Registration of the user information: User information is registered in the register table 31.

$\hat{2}$ Request for generation of the password: The user requests the generation of the password by the use of the password generation requesting terminal.

$\hat{3}$ Generation of the password: The password is generated.

$\hat{4}$ Notification of the password: The password is transmitted to the password receiving terminal.

$\hat{5}$ Authentication by the password: The user is authenticated by comparison between the password inputted by the user and the generated password.

$\hat{6}$ Invalidation of the password: The password which satisfies the password invalidating condition is invalidated.

The above-mentioned process will hereinunder be described in detail.

$\hat{1}$ Registration of the User Information

A person who desires authentication by the user authentication system 1 should register the following information (user information) in the database 30.

(a) The telephone number of the password requesting terminal. This information is essential. A single user may register plural telephone numbers.

(b) The user's name. This is the name as a user's identifier in the user authentication system 1. This information is required when the authentication system unit 60 authenticates the user by the use of a combination of the user's name and the password. This information is not necessary in case where the authentication is performed by the use of the password only.

(c) The telephone number of a facsimile machine. This information is required when the user uses the facsimile machine as the terminal for use in receiving the password (will hereinafter be referred to as a password receiving terminal).

(d) The telephone number of a pager. This information is required in case where the password receiving terminal of the user is the pager.

(e) The address of an electronic mail. This information is required in case where the user receives the password as the electronic mail.

(f) The password invalidating condition. This information is required in case where the password invalidating condition is set for each user.

(g) Other user information. For example, the name, the age, the birthday, the address, etc. This information is registered depending on the need of the service.

2 Request for generation of the password
3 Generation of the password
4 Notification of the password Next, description will be made about an operation of the user authentication system 1 after the user requests the generation of the password and until the user receives the password. In the request for generation of the password in 2, the user authentication system 1 authenticates the user who makes a call using the caller's telephone number notifying service. At this time, the call may not necessarily be connected. Specifically, a signal for notifying the caller's telephone number is a signal which is transmitted prior to the establishment of the line. Therefore, a public network connection unit 20 can authenticate the user without connecting the call. Under the circumstances, description will herein be made about two operations in the cases (a) where the public network connection unit 20 connects the call, and (b) where the public network connection unit 20 does not connect the call.

Figure 2:
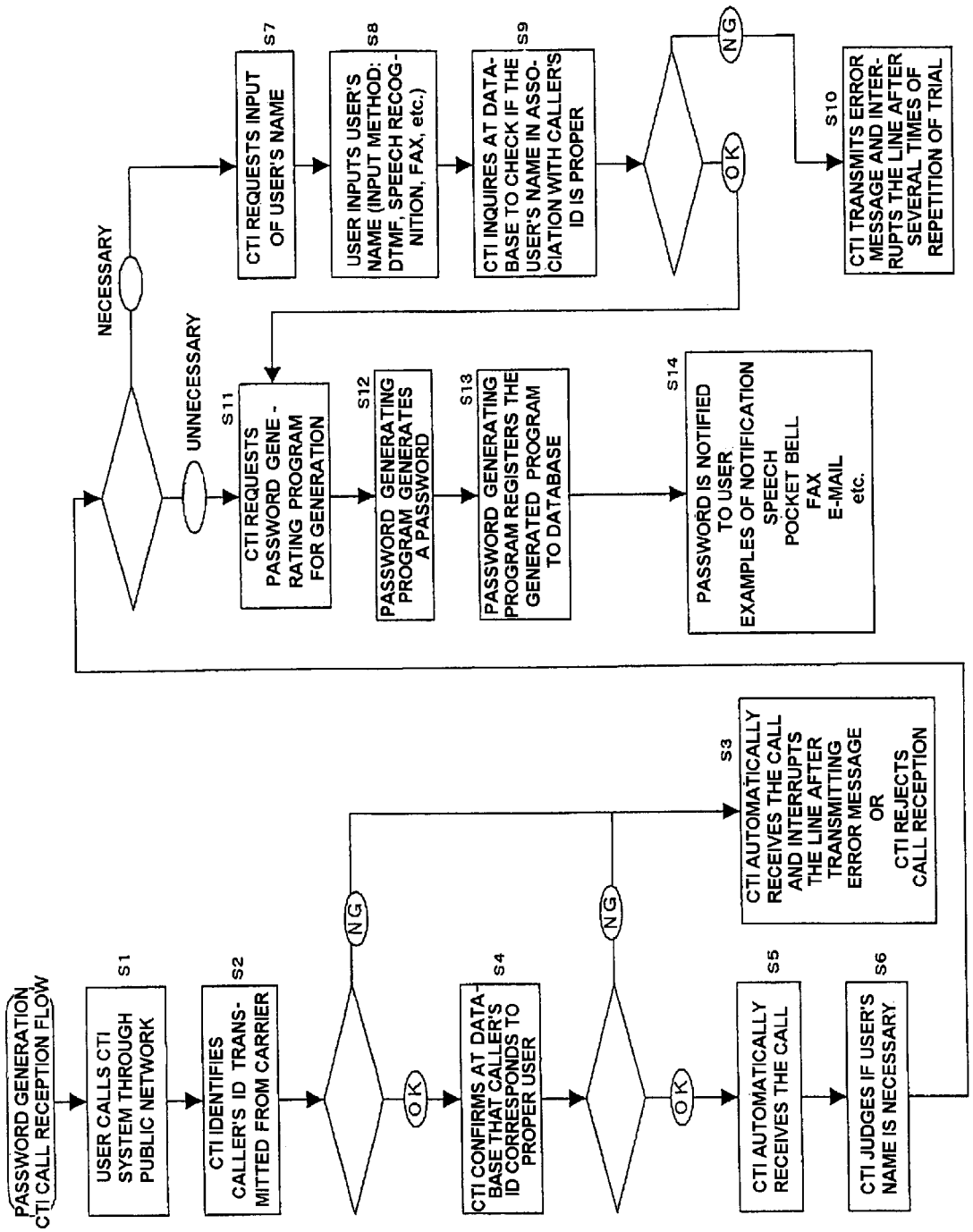
FIG. 2 is a view for describing an operation in the user authentication system 1 after a user requests the generation of a password and until the user receives the password.

(a) Operation in Case Where the Public Network Connection Unit 20 Connects the Call Referring to FIG. 2, description will be made. At first, the user calls the public network connection unit 20 by the use of the password generation requesting terminal (step S1). Then, a telephone communications carrier notifies an ID (a telephone number) of the password generation requesting terminal to the public network connection unit 20. In case where the caller's number is not notified because the calling party sets the caller's phone number to be unnotified or in case where the detected telephone number is not registered in the register table 31, the public network connection unit 20 rejects the call reception or automatically receives the call and interrupts the line immediately after transmitting an error message (step S3).

If the caller's number is set to be notified and the notified number is registered in the register table 31, the public network connection unit 20 automatically receives the call (step S5).

In case where the user's name is required for generation of the password, the user authentication system 1 requests the user by speech to input the user's name (step S7). In response to the request, the user inputs the user's name through the password generation requesting terminal (step S8). As regards input means, if the password comprises numerals only, the password is inputted by the use of numeral keys of the password generation requesting terminal. When the password contains characters or symbols other than the numerals, the numeral keys may similarly be used to input the password. In this case, each of the characters or the symbols is assigned with a unique code and the user inputs the codes by the use of the numeral keys to thereby input the characters or the like. In order to facilitate the input of the characters and the symbols, the public network connection unit 20 may be provided with a speech recognition unit so that the user inputs the password by utterance.

The database 20 refers to the register table 31 and judges whether or not the input user's name coincides with that registered as the user's name for the caller's telephone number being notified (step S9). Upon incoincidence, the user is requested to again input the user's name and the judgment is repeated (step S9). If the user's name is not correctly inputted after several times of repetition, an error message is displayed on the password generation requesting terminal and the connection is interrupted (step S10).

If the user's name coincides with that registered in the register table 31 or if the user is not requested to input the user's name upon requesting the generation of the password, the database 30 requests the password generation unit 41 to generate the password (step S11). Upon reception of the request, the password generation unit 41 generates the password in accordance with the predetermined specific logic (step S12). The password is registered in a password table 32 (step S13) and is transmitted to the password receiving terminal of the user (step S14). For example, in case where a facsimile machine serves as both the password generation requesting terminal and the password receiving terminal, the user is authenticated by the use of the telephone attached to the facsimile machine and then holds the line to receive the password converted by a data converter 22 into facsimile image data. If a pager is used as the password receiving terminal, the password is converted by the data converter 22 into a data format receivable by the pager and then transmitted to the pager of the user. Moreover, if an electronic mail receiving terminal is used as the password receiving terminal, a mail server 50 transmits an electronic mail containing the password to the mail address of the user.

Figure 3:
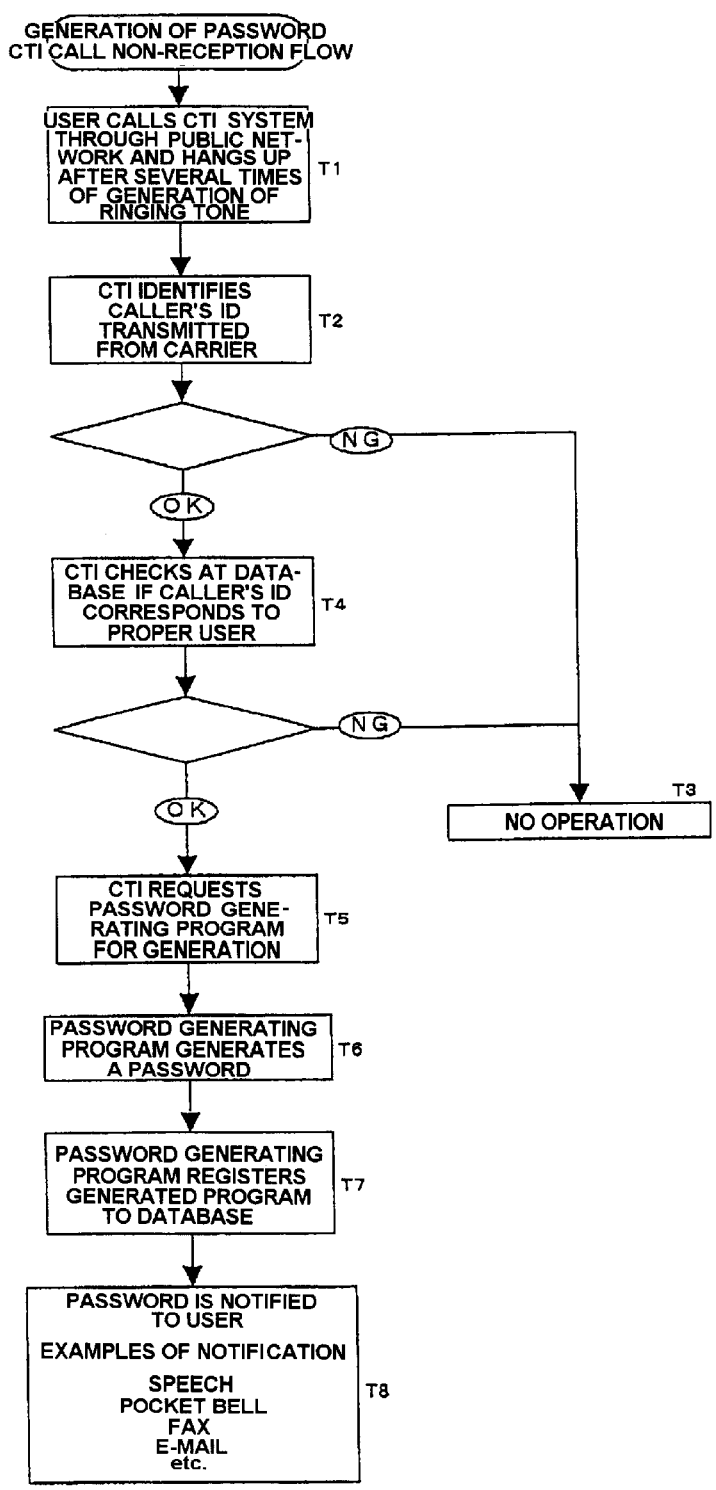
FIG. 3 is a view for describing an operation in the user authentication system 1 after a user requests the generation of a password and until the user receives the password.

(b) Operation in Case Where the Public Network Connection Unit 20 Does Not Connect the Call Next referring to FIG. 3, description will be made about an operation of the user authentication system 1 in case where the line is not established between the password generation requesting terminal and the public network connection unit 20 when the password generation request is made.

The user uses the password generation requesting terminal and calls the public network connection unit 20 via a line network of the telephone communications carrier and hangs up after several times of generation of a ringing tone (step T1). In this event, the public network connection unit 20 receives a signal indicative of the caller's telephone number but does not connect the call. If the call is made from the telephone having the caller's telephone number set to be unnotified, the call will be neglected (step T3).

When a caller's number identifying unit 21 identifies the caller's telephone number, the telephone number is given to the database 30. The database 30 searches the register table 31 in which the telephone numbers of the password generation requesting terminals of all the users are registered, to detect presence or absence of registration of the telephone number in question (step T2). If the coincident telephone number is not present in the register table 31, the password generation request will be neglected (step T3).

When the coincident telephone number is registered, the database 30 requests the password generating unit 41 to generate the password (step T5). In response, the password generating unit 41 generates the password in accordance with the specific logic (step T5).

The generated password is registered in the password table 32 (step T7) and transmitted to the password receiving terminal of the user from the public network connection unit 20 or the mail server 50 (step T8). The detailed description is herein omitted because it is identical with the description of the above-mentioned step S14.

5 Authentication by the Password

Figure 4:
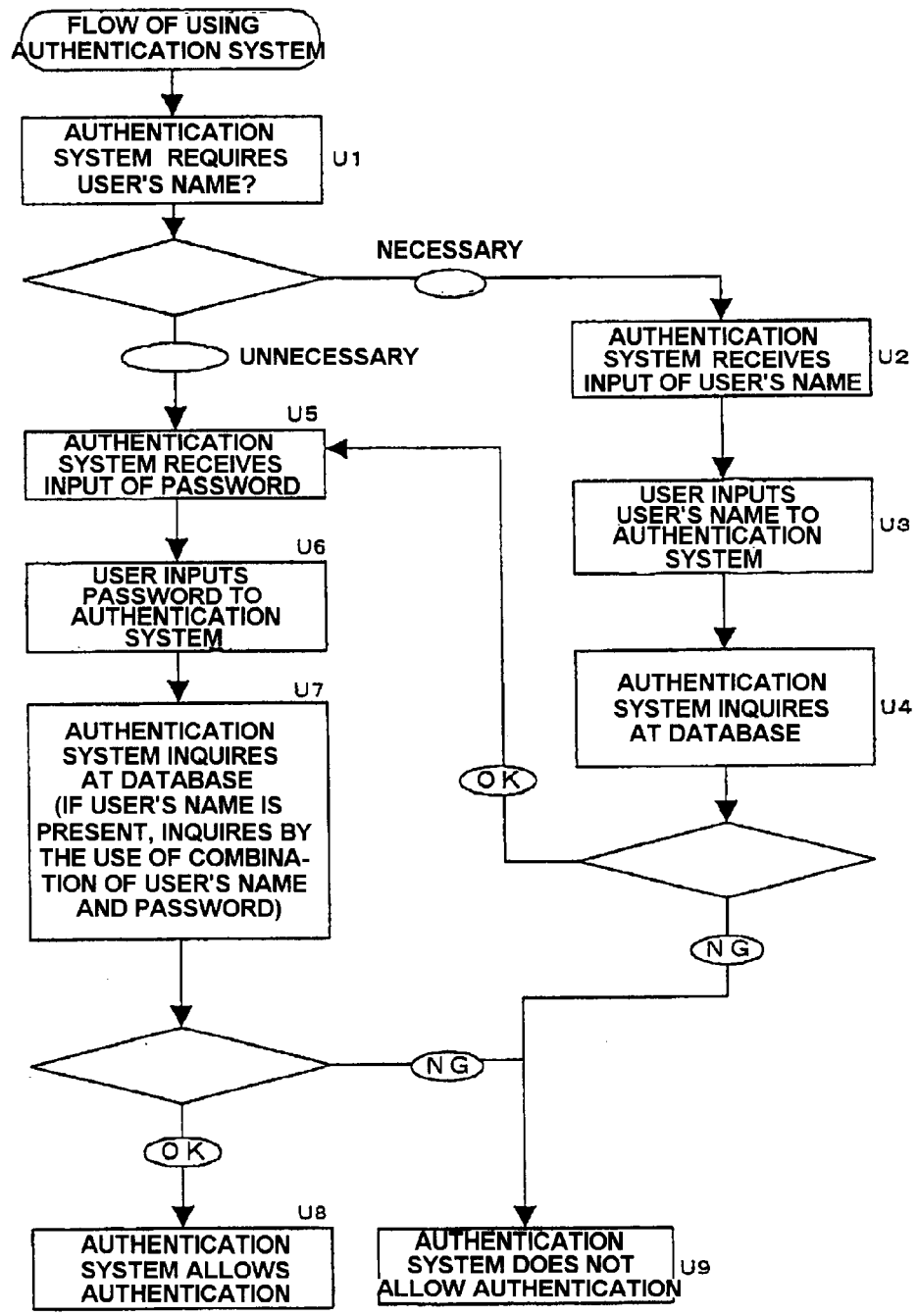
FIG. 4 is a view for describing the operation in the user authentication system 1 after the user receives the password and until the user is authenticated by an authentication system portion 60.

The user who receives the password as mentioned above inputs the password to the authentication system unit 60 and is authenticated by the authentication system unit 60. Next referring to FIG. 4, description will be made about an operation when the authentication system unit 60 authenticates the user by using the generated password.

The authentication system unit 60 receives from the user the input of the password alone or a combination of the user's name and the password. Herein, the user uses the input device such as a keyboard provided in the authentication system unit 60 to receive the password from the user. The input device may be radio communication means, for example, an infrared communication device. Specifically, each of the authentication system unit 60 and the password receiving terminal is provided with the radio communication means capable of performing data communication. The password received by the password receiving terminal in the above-mentioned steps 2 through 4 is transmitted to the authentication system unit 60 by the use of radio communication.

In case where the user's name is required for authentication, the user inputs the user's name through the input device of the authentication system unit 60 (steps U2, U3, and U4). If the user's name is not registered, the authentication system unit 60 does not authenticate the user (step U9).

In case where the user's name is registered or in case where the user's name is not used for authentication, the user inputs the password to the authentication system unit 60. Then, the authentication system unit 60 accepts the password (steps U5, U6, and U7) and checks password matching (if the user's name is used, matching is checked for the combination of the user's name and the password). If matching is detected, the authentication system unit 60 authenticates the user (step U8). Otherwise, the authentication is rejected (step U9).

The generated password is registered in the database system by a password generating program. If the user's name is used, the password is registered in association with the user's name.

The written password is stored in the database system for a predetermined time period and, if the preselected condition is satisfied, the password is deleted or invalidated by a password control program.

When the user's name is necessary, the password generating program makes the generated password be registered in the database system in association with the user's name.

6 Invalidation of the Password

Figure 5:
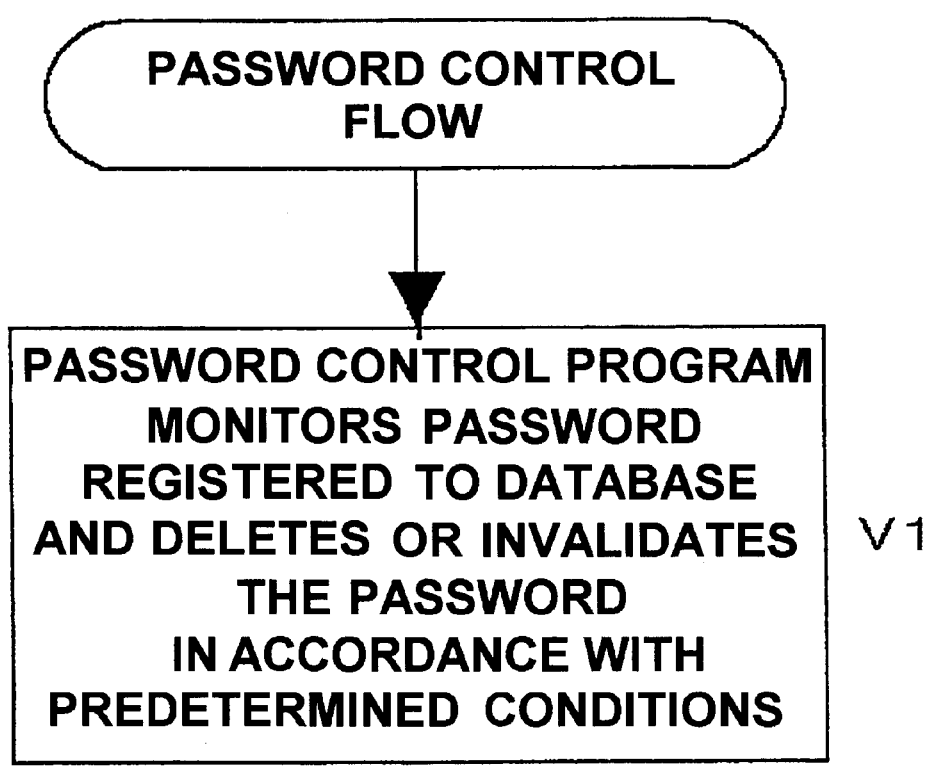
FIG. 5 is a view for describing a password management flow of the user authentication system 1.
Figure 6:
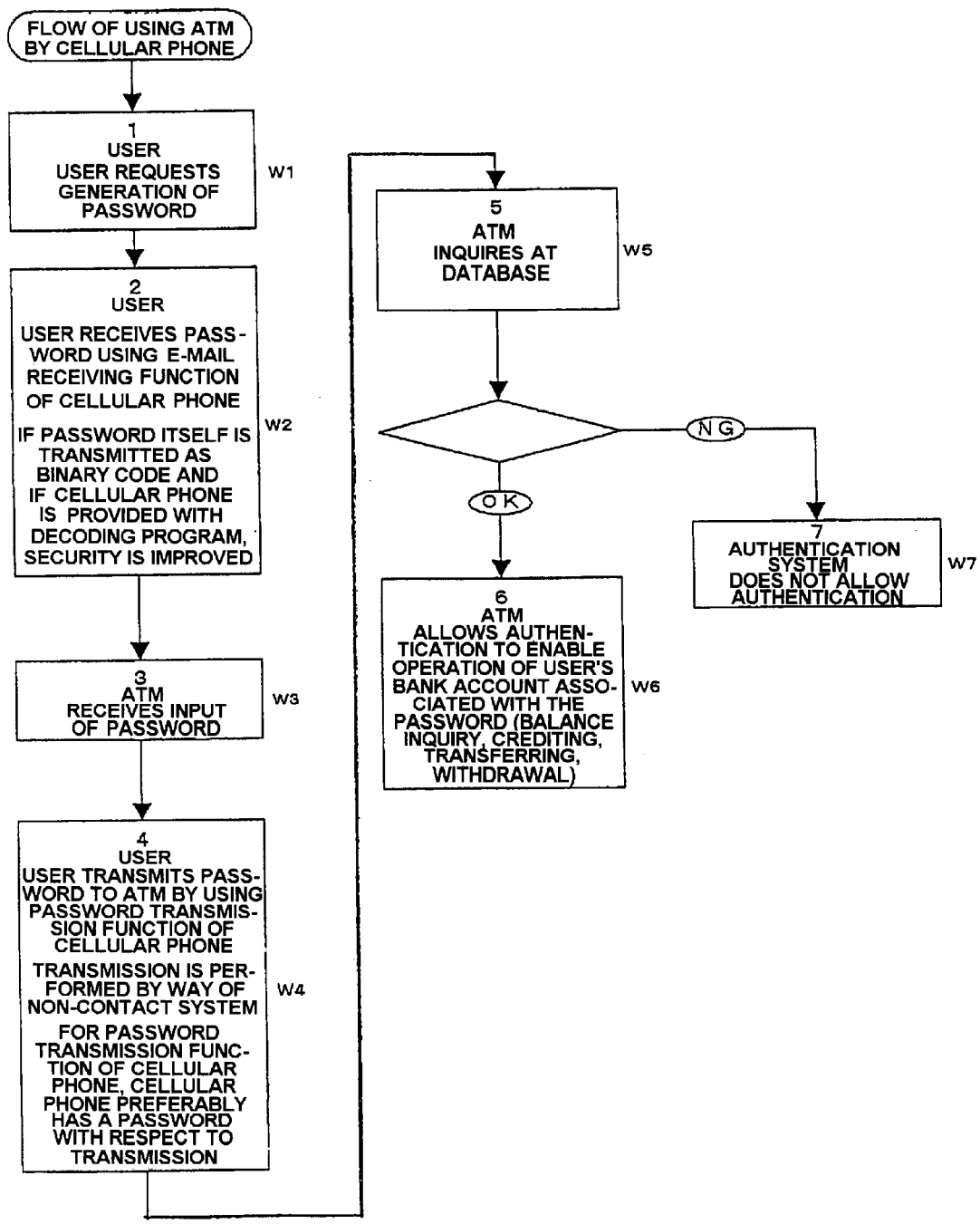
FIG. 6 is a flow chart for describing an ATM user authentication method according to a second embodiment of the present invention.

As illustrated in FIG. 5, the password which satisfies the preselected condition is deleted or invalidated by the password control program (step V1).

For example, the preselected condition is as follows.

The condition is the number of times of authentication in which the user uses the password in question. Herein, the password may be invalidated after it is used only once for authentication. Alternatively, the number of times of availability for authentication may be determined.

The condition is the lapse of time after the generation of the password. For example, when 60 minutes has lapsed after the generation of the password, the password will be invalidated even if it is not used for authentication.

The condition is the lapse of time after the last authentication using the password in question.

4. Second Embodiment

As a second embodiment, description will be made about user authentication for an ATM (automated teller machine) by using the cellular phone. Herein, the ATM corresponds to the authentication system unit 60. The cellular phone used in this embodiment has a function as an electronic mail receiving terminal and a radio communication interface such as infrared communication. The ATM also has a radio communication interface corresponding to that of the cellular phone.

The user makes a call from his own cellular phone to the public network connection unit 20 and requests the generation of the password (step W1).

The database 30 searches the register table 31 for the caller's telephone number identified by the caller's number identifying unit 21. Upon matching is detected, the user is authenticated as a proper user. Following this, the password generation unit 41 generates the password. The generated password is stored in the password table 32 and is transmitted through the mail server 50 to the cellular phone which serves as the electronic mail receiving terminal (step W2). In this event, the password may be transmitted not as text data but as a code of binary data, which can be processed by using a decoding program corresponding to the binary data to be used as the password. To this end, the cellular phone of the proper user is enabled to execute the decoding program. With this structure, even if the third person intercepts the electronic mail including the password data, the password to be used for authentication can not be obtained without the decoding program. Thus, the safety of the system can be more improved.

After receiving the password as mentioned above, the user changes the operation mode of the ATM into an operation state in which the password is receivable (step W3). Thereafter, the password is transmitted from the cellular phone to the ATM via the radio communication interface (step W4). Herein, upon using the password transmission function by the radio communication interface, it is preferable that the user is requested by the cellular phone to input the password so as to suppress the risk in the event that the cellular phone is lost or stolen.

Receiving the password from the cellular phone, the ATM accesses the database 30 and inquires about whether or not the received password has been authenticated. When the password is registered in the password table 32, the user is authenticated as the proper user and allowed to operate a bank account by the ATM (step W6). If no corresponding password is registered in the password table 32, the use of the bank account by the user is rejected (step W7).

The above-mentioned structure of the user identification system is a mere example. It is obvious for those skilled in the art that each component forming the system of the present invention can be realized even by distributed processing executed by a plurality of information processing devices distributed on the network.

For example, in the user authentication system 1, the database 30 stores both the register table 31 and the password table 32. However, it is obvious that the similar effect can be obtained in case where the password table 32 is stored in the authentication system unit 60.

Industrial Applicability

According to the present invention, the user authentication is performed by the use of the telephone which is already wide spread at present. Therefore, the equivalent effect can be obtained at low cost as compared with the conventional technique which requires the hardware exclusively for use in authentication. It is especially convenient to use the cellular phone or the personal handyphone system.

According to the present invention, the password generation requesting terminal need not be same as the password receiving terminal. Therefore, the user can receive the password in a most convenient form in dependence upon the situation of each user.

This invention is also applicable to authentication of information processing devices, such as the electronic lock for locking a building and the automatic cash dispenser, which are not accessible from the user's terminal.

Even in case where a same terminal is used by a plurality of users, individual users can be separately authenticated by additionally using the user's name upon authentication.

While the present invention has been described in conjunction with the embodiments thereof, the present invention is not limited thereto but can be modified or improved within the scope of the general knowledge of those skilled in that art.

What is claimed is:

1. A user authentication method of authenticating a preliminarily registered user by a device for providing service (hereinafter referred to as a service provider), characterized by the steps:

(1) a telephone number of a telephone of a user is registered prior to authentication;
    (2) the user calls a CTI (computer telephony integration) server by using the telephone thus registered;
    (3) the CTI server authenticates the user with reference to the telephone number received;
    (4) the CTI server or another information processing device operable in cooperation with the CTI server generates a password;
    (5) the password thus generated is transmitted to both the user and the service provider;
    (6) the user inputs the password which he has received to a device (hereinafter referred to as a service access authentication device) for authenticating the access to the service provider;
    (7) the service access authentication device compares the password received in the step (5) and the password inputted in the step (6) and, upon coincidence between the both passwords, allows the user to access to the service provider; and
    (8) the password which has been used for the authentication is invalidated.

2. A user authentication method as claimed in claim 1, wherein a password is invalidated, even if the user has not yet been authenticated by the use of the password, in case where a predetermined time period has lapsed after the password is generated.

3. A user authentication method as claimed in claim 1, wherein the telephone whose telephone number is registered in the step (1) is a portable mobile communication terminal.

4. A user authentication method as claimed in claim 1, wherein the destination of the password to be transmitted to the user in the step (5) and a data format thereof are determined by the user.

5. A user authentication method as claimed in claim 1, wherein the password transmitted to the user in the step (5) is transmitted as character data to a pager having a preliminarily registered telephone number.

6. A user authentication method as claimed in claim 1, wherein the password transmitted to the user in the step (5) is transmitted as image data to a facsimile apparatus having a preliminarily registered telephone number.

7. A user authentication method as claimed in claim 1, wherein the password transmitted to the user in the step (5) is transmitted as a speech produced by a speech synthesizer to the telephone which is registered in the step (1).

8. A user authentication method as claimed in claim 1, wherein the telephone which is registered in the step (1) comprises image display means, the password transmitted to the user in the step (5) being transmitted as character data to the telephone which is registered in the step (1).

9. A user authentication method as claimed in claim 1, wherein the password transmitted to the user in the step (5) is transmitted as an electronic mail to a mail address specified by the user.

10. A user authentication method as claimed in claim 1, wherein the password transmitted to the user in the step (5) is binary data.

11. A user authentication method as claimed in claim 1, wherein the telephone registered in the step (1) comprises radio communication means and the input of the password to the service access authentication system in the step (6) is carried out via the radio communication means.

12. A user authentication system comprising one or a plurality of information processing devices operable in cooperation through mutual data communication and a telephone assigned to each user, wherein any one of the information processing devices includes:

line connection means to be connected to a telephone through a telephone line;
    caller's number identifying means for identifying a caller's telephone number of a call received at the line connection means;
    a first recording medium for storing, as user information associated with each user, information relating to each user and including a telephone number of the telephone assigned to the user;
    telephone number searching means for searching, by referring to the first recording medium, the telephone numbers given to the telephones assigned to the respective users and contained in the user information to find whether or not the telephone number identified by the caller's number identifying means is present;
    password generating means for generating a password;
    a second recording medium for storing the password generated by the password generating means in association with the user information stored in the first recording medium;
    password notifying means for notifying the password to an appropriate destination by referring to, as a destination, the telephone number searched by the telephone number searching means or the user information associated with the telephone number;
    password input means for receiving an input password inputted by the user;
    authentication means for comparing the password stored in the second recording medium and the input password supplied through the password input means and authenticating the user upon coincidence between both passwords; and
    means for deleting from the second recording medium or invalidating a particular password which satisfies a predetermined condition.

13. A user authentication system as claimed in claim 12, wherein the telephone assigned to each user is a portable mobile communication terminal.

14. A user authentication system as claimed in claim 12, wherein:

any one of the information processing devices further comprises speech synthesizing means for synthesizing a speech corresponding to the password generated by the password generating means;

the password notifying means transmitting the speech synthesized by the speech synthesizing means through the telephone line.

15. A user authentication system as claimed in claim 12, wherein:

any one of the information processing devices further comprises facsimile image data generating means for generating facsimile image data corresponding to the password generated by the password generating means;

the password notifying means transmitting the facsimile image data generated by the facsimile image data generating means through the telephone line.

16. A user authentication system as claimed in claim 12, wherein:

any one of the information processing devices further comprises pager data generating means for generating data for a pager to display the password generated by the password generating means;

the password notifying means transmitting the data generated by the pager data generating means through the telephone line.

17. A user authentication system as claimed in claim 12, wherein:

any one of the information processing devices further comprises electronic mail generating means for generating an electronic mail indicating the password generated by the password generating means and means for establishing connection to the Internet;

the password notifying means transmitting the electronic mail generated by the electronic mail generating means through the Internet.

18. A user authentication system as claimed in claim 12, wherein the predetermined condition is any one of the cases:

where a predetermined time period has lapsed after the password is generated by the password generating means;

where a preselected time period has lapsed after the latest authentication was carried out by the use of the password; and where the password has been used for authentication a predetermined number of times.

19. A user authentication system as claimed in claim 12, wherein the authentication means authenticates the access to contents on the network.

20. A user authentication system as claimed in claim 12, wherein the authentication means is connected to a device for controlling an electronic lock and allows the electronic lock to be unlocked.

21. A user authentication system as claimed in claim 12, wherein the authentication means authenticates the user of an automatic financing device.

22. A recording medium which is a machine-readable recording medium storing a program to be executed by one or a plurality of information processing devices and operable in cooperation through mutual data communication, wherein the program make the information processing device execute:

an operation of generating a first table storing, as user information associated with each user, information relating to each user and including a telephone number of a telephone assigned to the user;

a caller's number identifying operation of identifying a caller's telephone number of a call received through a telephone line;

a telephone number searching operation of searching, by referring to the first table, the telephone numbers given to the telephones assigned to the respective users and contained in the user information to find the telephone number identified by the caller's number identifying operation;

a password generating operation of generating a password;

an operation of generating a second table storing the password generated by the password generating operation in association with the user information stored in the first table;

a password notifying operation of notifying the password to an appropriate destination by referring to, as a destination, the telephone number found by the telephone number searching operation or the user information associated with the telephone number;

a password input operation of receiving an input password inputted by the user;

an authenticating operation of comparing the password stored in the second table and the input password supplied by the password input operation and authenticating the user upon coincidence between both passwords; and an operation of deleting from the second table or invalidating a particular password which satisfies a predetermined condition.

23. A recording medium as claimed in claim 22, wherein:

the program further includes a speech synthesizing operation of synthesizing a speech corresponding to the password generated by the password generating operation;

the password notifying operation making the information processing device execute an operation of transmitting the speech synthesized by the speech synthesizing operation through the telephone line.

24. A recording medium as claimed in claim 22, wherein:

the program further includes a facsimile image data generating operation of generating facsimile image data corresponding to the password generated by the password generating operation;

the password notifying operation makes the information processing device execute an operation of transmitting the facsimile image data generated by the facsimile image data generating operation through the telephone line.

25. A recording medium as claimed in claim 22, wherein:

the program further includes a pager data generating operation of generating data for a pager to display the password generated by the password generating operation;

the password notifying operation making the information processing device execute an operation of transmitting the data generated by the pager data generating operation through the telephone line.

26. A recording medium as claimed in claim 22, wherein:

the program further includes an electronic mail generating operation of generating an electronic mail indicating the password generated by the password generating operation and an operation of establishing connection to the Internet;

the password notifying operation making the information processing device execute an operation of transmitting the electronic mail generated by the electronic mail generating operation through the Internet.

27. A recording medium as claimed in claim 22, wherein the predetermined condition is any one of the cases:
- where a predetermined time period has lapsed after the password is generated by the password generating means;
- where a preselected time period has lapsed after the latest authentication was carried out by the use of the password; and
- where the password has been used for authentication a predetermined number of times.

28. A recording medium as claimed in claim 22, wherein the authenticating operation makes the information processing device execute an operation of authenticating the access to contents on the network.

29. A recording medium as claimed in claim 22, wherein the authenticating operation makes the information processing device execute an operation of allowing an electronic lock to be unlocked.

30. A recording medium as claimed in claim 22, wherein the authenticating operation makes the information processing device execute an operation of authenticating the user of an automatic financing device.

* * * * *